(12) United States Patent
Fink et al.

(10) Patent No.: US 10,978,217 B2
(45) Date of Patent: Apr. 13, 2021

(54) THERMALLY-DRAWN FIBER INCLUDING POROSITY

(71) Applicant: Massachusetts Institute of Technology, Cambridge, MA (US)

(72) Inventors: Yoel Fink, Brookline, MA (US); Benjamin Jean-Baptiste Grena, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 941 days.

(21) Appl. No.: 14/624,516

(22) Filed: Feb. 17, 2015

(65) Prior Publication Data
US 2016/0155534 A1 Jun. 2, 2016

Related U.S. Application Data

(60) Provisional application No. 61/942,580, filed on Feb. 20, 2014.

(51) Int. Cl.
*H01B 7/00* (2006.01)
*D01F 1/09* (2006.01)
(Continued)

(52) U.S. Cl.
CPC ........... *H01B 7/0027* (2013.01); *D01D 5/247* (2013.01); *D01D 5/30* (2013.01); *D01F 1/09* (2013.01);
(Continued)

(58) Field of Classification Search
CPC ......... D01D 5/24–253; D01D 5/28–36; D01D 5/247; D01F 1/08–09; D01F 8/04–18;
(Continued)

(56) References Cited

U.S. PATENT DOCUMENTS 4,029,726 A * 6/1977 Nichols ...................... A61L 9/01
106/168.01
4,957,943 A * 9/1990 McAllister ............... C08K 3/22
521/64
(Continued)

FOREIGN PATENT DOCUMENTS

WO WO-2007143237 A2 * 12/2007 ............. B82Y 30/00

OTHER PUBLICATIONS

Qu et al,. "Flexible fiber batteries for applications in smart textiles," 2012 MRS Fall Meeting, Invited Talk A4.01, Symposium A: Compliant Energy Sources, Manuscript ID: 1445687, pp. 1-8, Boston, MA, Oct. 2012. (Year: 2012).*
(Continued)

*Primary Examiner* — Laura C Powers
*Assistant Examiner* — Larissa Rowe Emrich
(74) *Attorney, Agent, or Firm* — Theresa Lober

(57) ABSTRACT

There is provided a fiber that includes a fiber material disposed along a longitudinal-axis fiber length. A porous domain has a porous domain length along at least a portion of the fiber length, within the fiber material. The porous domain includes solid-phase material regions and fluid-phase interstitial regions that are both along the porous domain length and across the porous domain, for multi-dimensional porosity of the porous domain.

33 Claims, 6 Drawing Sheets

(51) Int. Cl.
    H01B 3/00      (2006.01)
    H01M 4/75     (2006.01)
    H01M 10/04    (2006.01)
    D01D 5/247    (2006.01)
    D01D 5/30     (2006.01)
(52) U.S. Cl.
    CPC .............. *H01B 3/004* (2013.01); *H01M 4/75* (2013.01); *H01M 10/04* (2013.01)
(58) Field of Classification Search
    CPC ....... H01B 3/004; H01B 7/0027; H01M 4/75; H01M 10/04; Y10T 428/2973; Y10T 428/2975; Y10T 442/612; D10B 2401/10; D10B 2410/16
    USPC .................................. 428/397–398; 442/338
    See application file for complete search history.

(56) References Cited

U.S. PATENT DOCUMENTS

| | | | | |
|---|---|---|---|---|
| 5,744,236 | A * | 4/1998 | Rohrbach | D01D 5/24 264/177.12 |
| 6,117,802 | A * | 9/2000 | Rohrbach | D01D 5/24 428/372 |
| 6,610,395 | B2 * | 8/2003 | Rohrbach | H05K 9/0083 428/292.1 |
| 7,935,418 | B2 | 5/2011 | Koops et al. | |
| 8,383,026 | B1 * | 2/2013 | Luebke | D01D 5/06 264/172.16 |
| 10,406,723 | B2 | 9/2019 | Fink et al. | |
| 2005/0053345 | A1 | 3/2005 | Bayindir et al. | |
| 2008/0053891 | A1 | 3/2008 | Koops et al. | |
| 2012/0189795 | A1 * | 7/2012 | Wong | D01D 5/0069 428/36.91 |
| 2020/0028198 | A1 | 1/2020 | Lee et al. | |

OTHER PUBLICATIONS

Hale, M.. (2000). Geochemical Remote Sensing of the Sub-Surface-3.3 Voltaic Cells. Elsevier. 86-91. Online version available at: https://app.knovel.com/hotlink/pdf/id:kt004OUTU2/geochemical-remote-sensing/voltaic-cells (Year: 2000).*
Gevorkian, Peter. "Lithium-Ion Batteries." Large-scale Solar Power Systems: Construction and Economics. N.p.: Cambridge UP, 2012. 255-59. Print. Online version available at: https://app.knovel.com/hotlink/pdf/id:kt00C4L5G4/large-scale-solar-power/lithium-ion-battery-charge (Year: 2012).*
Schut, H. "New Cyclic Olefins." Plastics Technology. Plastics Technology, Mar. 1, 2000. Web. May 10, 2018. <https://www.ptonline.com/articles/new-cyclic-olefins>. (Year: 2000).*
Lin, Meng-Fang, Vijay Kumar Thakur, Eu Jin Tan, and Pooi See Lee. "Dopant Induced Hollow BaTiO3 Nanostructures for Application in High Performance Capacitors." Journal of Materials Chemistry 21.41 (2011): 16500-6504. Print. (Year: 2011).*
Wypych, George. (2010). Handbook of Fillers (3rd Edition)—5.4 Particle Shape.ChemTec Publishing. Retrieved from https://app.knovel.com/hotlink/pdf/id:kt007C18G4/handbook-fillers-3rd/particle-shape (Year: 2010).*
"Spinning." Complete Textile Glossary. New York, NY: Celanese Acetate, 2001. N. pag. Print. (Year: 2001).*
Ebnesajjad, Sina. (2015). Fluoroplastics, vol. 1—Non-Melt Processible Fluoropolymers—The Definitive User's Guide and Data Book (2nd Edition)—5.7 Process Classification. Elsevier. Retrieved fromhttps://app.knovel.com/hotlink/pdf/id:kt00U9JYC1/fluoroplastics-volume/process-classification (Year: 201.*
Kutz, Myer. (2017). Applied Plastics Engineering Handbook—Processing, Materials, and Applications (2nd Edition)—7.4.1 Polycaprolactone. Elsevier. Retrieved fromhttps://app.knovel.com/hotlink/pdf/id:kt011DY911/applied-plastics-engineering/polycaprolactone (Year: 2017).*

PCT/US2015/016224, International Search Report, Form PCT/ISA/210 first sheet, second sheet, and patent family annex, Nov. 2015.
PCT/US2015/016224, Written Opinion of the International Searching Authority, Form PCT/ISA/237 cover sheet, Box No. I sheet, Box No. V sheet, and Separate sheet sheets 1-2, Nov. 2015.
Lestoquoy et al., "Fabrication and characterization of thermally drawn fiber capacitors," Appl. Phys. Letts., No. 102, pp. 152908-1-152908-5, Apr. 2013.
Qu et al., "Flexible fiber batteries for applications in smart textiles," 2012 MRS Fall Meeting, Invited Talk A4.01, Symposium A: Compliant Energy Sources, Manuscript ID: 1445687, pp. 1-8, Boston, MA, Oct. 2012.
Grena, "Towards a Lithium-ion Fiber Battery," Masters of Science in Materials Science and Engineering, Thesis, Massachusetts Institute of Technology, pp. 1-47, Jan. 2015.
Liu et al., "Flexible, Solid Electrolyte-Based Lithium Battery Composed of LiFePO4 Cathode and Li4Ti5O10 Anode for Applications in Smart Textiles," Jnl. of the Electrochmical Society, N. 159, pp. A349-A356, Jan. 2012.
Grena et al., "Porous polymeric domains in thermally drawn fibers," 2014 MRS Spring Meeting, Session R9, Poster Session III: Energy Conversion and Storage, Poster R9.15, "Porosity in Thermally Drawn Fiber," San Francisco, CA Apr. 2104.
Bae et al., "Fiber Supercapacitors Made of Nanowire-Fiber Hybrid Structures for Wearable/Flexible Energy Storage," Angew. Chem. Int. Ed., vol. 50, pp. 1683-1687, Jan. 2011.
Chen, "Novel Electric Double-Layer Capacitor with a Coaxial Fiber Structure," Adv. Mater. vol. 25, pp. 6436-6441, Aug. 2013.
Chen, "Electrochromic Fiber-Shaped Supercapacitors" Adv. Mater. vol. 26, pp. 8126-8132, Oct. 2014.
Chen et al., "High-Performance, Stretchable, Wire-Shaped Supercapacitors," Angew. Chem. Int. Ed., vol. 54, pp. 618-622, Nov. 2014.
Choi et al., "Flexible Supercapactor Made of Carbon Nanotube Yarn with Internal Pores," Adv., Mater., vol. 26, pp. 2059-2065, Dec. 2013.
Fu et al., "Fiber Supercapacitors Utilizing Pen Ink for Flexible/Wearable Energy Storage," Adv. Mater., vol. 24, pp. 5713-5718, Aug. 2012.
Hu et al., "All-in-one graphene fiber supercapacitor," Nanoscale, vol. 6, pp. 6448-6451, Apr. 2014.
Kou et al., "Coaxial wet-spun yarn supercapacitors for high-energy density and safe wearable electronics," Nature Communications, V. 5, pp. 3754(1-10), May 2014.
Kwon et al., "Cable-Type Flexible Lithium Ion Battery Based on Hollow Multi-Helix Electrodes," Avd. Mater., vol. 24, pp. 5192-5197, Aug. 2012.
Le et al., "Coaxial Fiber Supercapacitor Using All-Carbon Material Electrodes," ACSNano, vol. 7, No. 7, pp. 5940-5947, Jun. 2013.
Lee et al., "Ultrafast charge and discharge biscrolled yarn supercapacitors for textiles and microdevices," Nature Communications, vol. 4, pp. 1970(1-8), Jun. 2013.
Liang et al., "Series of in-fibergraphene supercapacitors for flexible wearable devices," J. Mater. Chem. A., vol. 3, pp. 2547-2551, Dec. 2014.
Lima et al., "Biscrolling Nanotube Sheets and Functional Guests into Yarns," Science, vol. 33, pp. 51-55, Jan. 2011.
Lin et al., "Twisted Aligned Carbon Nanotube/Silicon Composite Fiber Anode for Flexible Wire-Shaped Lithium-Ion Battery," Adv. Mater., vol. 26, pp. 1217-1222, Nov. 2013.
Liu et al., "Cable-Type Supercapacitors of Three-Dimensional Cotton Thread Based Multi-Grade Nanostructures for Wearable Energy Storage," Adv. Mater, vol. 25, pp. 4925-4931, Jul. 2013.
Neudecker et al., "Power fibers: Thin-Film Batteries on Fiber Substrates," Unclassified OMB Report, Report Documentation page and Report pp. 1-9, ITN Energy Systems, Inc., Littleton, CO, 2003.
Ren et al., "Twisting Carbon Nanotube Fibers for Both Wire-Shaped Micro-Supercapacitor and Micro-Battery," Adv. Mater., vol. 25, pp. 1155-1159, Nov. 2012.
Ren et al., "Elastic and Wearable Wire-Shaped Lithium-Ion Battery with High Electrochemical Performance," Angew. Chem. Int., Ed., vol. 53, pp. 7864-7869, Jun. 2014.

(56) References Cited

OTHER PUBLICATIONS

Wang et al., "Fiber-Based Flexible All-Solid-State Asymmetric Supercapacitors for Integrated Photodetecting System," Angew. Chem. Int. Ed., vol. 53, pp. 1849-1853, Jan. 2014.

Weng et al., "Winding Aligned Carbon Nanotube Composite Yarns into Coaxial Fiber Full Batteries with High Performances," Nano Lett., vol. 14, pp. 3432-3438, May 2014.

Xiao et al., "Fiber-Based All-Solid-State Flexible Supercapacitors for Self-Powered Systems," ACSNano, vol. 6, No. 10, pp. 9200-9206, Sep. 2012.

Xu et al., "Carbon Nanotube Fiber Based Stretchable Wire-Shaped Supercapacitors," Adv. Energy Mater., vol. 4, pp. 1300759(1-6), Oct. 2013.

Yang et al., "A Highly Stretchable, Fiber-Shaped Supercapacitor," Angew. Chem. Int. Ed., vol. 52, pp. 13453-13457, Nov. 2013.

Yu et al., "Scalable synthesis of hierarchically structured carbon nanotube-graphene fibres for capacitive energy storage," Nature Nanotechnology, vol. 9, pp. 555-562, Corrigendum one page, Supplementary Information pp. S1-S32, Jul. 2014.

Zhang et al., "Integrated Polymer Solar Cell and Electrochemical Supercapacitor in a Flexible and Stable Fiber Format," Adv. Mater., vol. 26, pp. 466-470, Oct. 2013.

Zhang et al., "Superelastic Supercapacitors with High Performances during Stretching," Adv. Mater., vol. 27, pp. 356-362, Nov. 2014.

Zhang et al. "Flexible and Stretchable Lithium-Ion Batteries and Supercapacitors Based on Electrically Conducting Carbon Nanotube Fiber Springs," Angew. Chem. Int. Ed., vol. 53, pp. 14564-14568, Oct. 2014.

Zhang et al., "Super-stretchy lithium-ion battery based on carbon nanotube fiber," J. Mater. Chem. A., vol. 2, pp. 11054-11059, May 2014.

\* cited by examiner

FIBER
DRAW

FIBER
DRAW

THERMALLY-DRAWN FIBER INCLUDING POROSITY

CROSS-REFERENCE TO RELATED APPLICATIONS

This application claims the benefit of U.S. Provisional Application No. 61/942,580, filed Feb. 20, 2014, the entirety of which is hereby incorporated by reference.

STATEMENT REGARDING FEDERALLY SPONSORED RESEARCH

This invention was made with Government support under Contract No. DMR-0819762, awarded by the U.S. NSF; under Contract No. W911NF-070D-004, awarded by the U.S. NSF; and under Contract No. W911NF-13-D-0001, awarded by the U.S. ARO. The Government has certain rights in this invention.

BACKGROUND

This invention relates generally to thermally drawn fibers, and more particularly relates to the control of composition and morphology of the materials in thermally drawn fibers.

The process of thermally drawing a fiber preform into a fiber has been exploited for a wide range of applications, including production of optical fiber, fiber-based sensors, and fiber-based radiation tools. The thermal drawing process is a low-cost and intrinsically scalable fabrication method that enables production of extended lengths of fiber material with well-controlled geometry and electromagnetic transport characteristics over such extended lengths. Beyond conventional optical transmission fibers, thermal fiber drawing has been shown to be capable of producing combined optical and electrical transmission, as well as micro-scale microelectronic and optoelectronic device operation, along a fiber length and/or across a fiber's cross-section. Many optoelectronic applications have been particularly well-addressed by fibers produced with thermal drawing methodology.

Indeed, the ability of the thermal drawing process to produce fibers including intimately interfaced materials having widely disparate electrical conductivities and refractive indices, and to realize arbitrary lateral geometries over extended lengths has enabled the realization of electronic, photonic and optoelectronic device functionalities at length scales and cost of conventional optical fiber thermal drawing, rather than microelectronic fabrication. But in general, preform-based thermal drawing fiber production has been restricted to fibers with internal fiber features that are generally uniform or homogeneous in composition along fiber length. As a result, a wide range of applications that could be addressed with fiber technology cannot be realized by preform-based fiber thermal drawing processes.

SUMMARY

There is provided a fiber that includes a fiber material which is disposed along a longitudinal-axis fiber length. There is a porous domain that has a porous domain length along at least a portion of the fiber length, within the fiber material. The porous domain includes solid-phase material regions and fluid-phase interstitial regions that are both along the porous domain length and across the porous domain, for multi-dimensional porosity of the porous domain.

This fiber is achieved with a method for forming a fiber including a porous domain. In the method, a fiber preform is assembled, including a solid polymer region having a hollow region extending through the solid polymer along a longitudinal axis of the fiber preform. The hollow region is filled with a liquid solution including a first component and a second component. The first and second liquid solution components are mixed in the liquid solution at temperatures greater than a phase-separation temperature and the liquid solution transforms to solid-phase regions and fluid-phase regions at temperatures less than the phase-separation temperature. The fiber preform is drawn into a fiber by applying tension to the fiber preform at a fiber draw temperature that is greater than the phase-separation temperature of the liquid solution. The fiber is cooled from the fiber draw temperature to a temperature that is less than phase-separation temperature of the liquid solution, to form a thermally drawn fiber having a porous domain, extending the length of the drawn fiber, that includes solid-phase material regions and fluid-phase regions.

This enables the production of a fiber having selected functionality, e.g., as a fiber including a fiber material disposed along a longitudinal-axis fiber length. A porous domain is disposed, having a porous domain length along at least a portion of the longitudinal-axis fiber length, within the fiber material. The porous domain includes polymer spheres with interstices, around the polymer spheres, that are filled with an electrolytic fluid and interconnected to form a path of conductivity along the porous domain length and across the porous domain. An electrically conducting anode is in contact with the porous domain along the porous domain length within the fiber material, and an electrically conducting cathode is in contact with the porous domain along the porous domain length within the fiber material. An electrically conducting current collector is in contact with the anode along the porous domain length within the fiber material and an electrically conducting current collector in contact with the cathode along the porous domain length with the fiber material.

This fiber arrangement and the methods for producing this fiber enable a wide range of fiber-based applications, such as in the fields of energy and power delivery, filtration, thermal insulation, drug delivery, tissue engineering, mass transport, chemical reaction, sensing, and other applications. All of electrical, mechanical, and chemical functionality can be provided in the porous fiber. The porous fiber can be configured, e.g., as a battery, as a drug delivery system, as a chemical reaction chamber, as a sensor, or other functional structure. Along with such functionality, the porous fiber can transmit optical and/or electrical signals through the length of the fiber with regions that are included in the fiber for such transmittal. Other features and advantages of the fiber will be apparent from the description and accompanying drawings, and from the claims.

DETAILED DESCRIPTION

The fiber provided herein includes at least one continuous porous domain along at least a portion of the longitudinal length of the fiber. The porous domain exhibits porosity in at least one direction, and preferably in more than one direction, i.e., exhibiting multi-dimensional porosity. The term porosity herein refers to a condition in which a solid-phase material is provided with a population of fluid-phase interstices, pores, holes, passages, openings, or other pathways within the solid-phase material. These fluid-phase regions render the solid-phase material as porous solid-phase material regions along the length of the porous domain, i.e., along the longitudinal axis of the fiber, as well as across the cross-section of the porous domain, i.e., in one or more directions that are not along the longitudinal axis of the fiber. The solid-phase material can be considered to be porous in that interstices or pores exist among solid-phase regions in the domain. For conditions in which the porous domain exhibits multi-dimensional porosity, such multi-dimensional porosity refers to a condition in which interstices or pores are present in at least two directions, such as along the domain and across the domain, and preferably in all three dimensions in the solid-phase material of the porous domain.

Figure 1A:
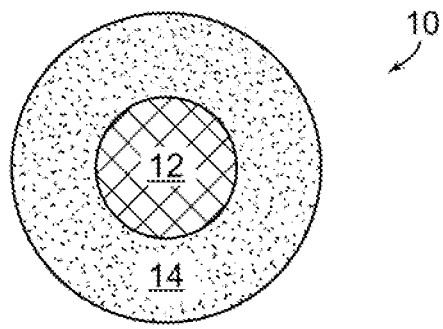
FIGS. 1A-1D are schematic cross-sectional views of thermally drawn fibers including one or more porous domains within the fibers.
Figure 1B:
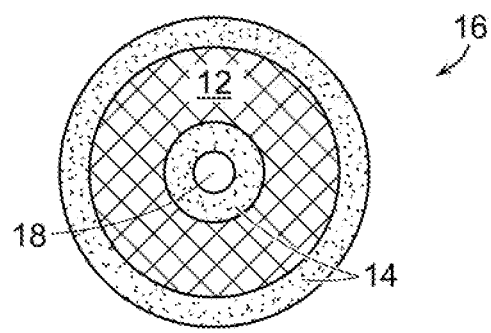
Figure 1C:
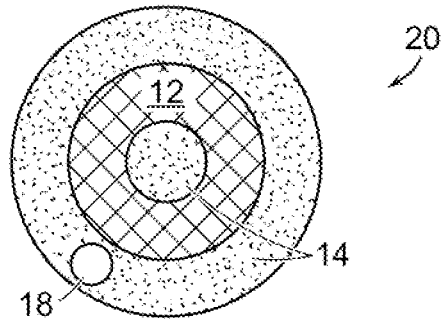
Figure 1D:
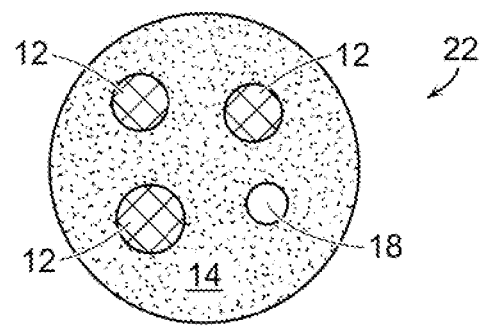

FIGS. 1A-1D are schematic cross-sectional views of fibers including at least one porous domain. As shown in FIG. 1A, a fiber 10 can include one or more porous domains, such as porous domain 12, and one or more non-porous domains, such as solid fiber material 14. The solid fiber material 14 can include fiber cladding material, fiber core material, fiber elements, and other material to be included in the drawn fiber. In the figures, the various fiber domains are indicated by contrasting fill patterns not necessarily representative of their composition; the cross hatching shown for the porous domains 12 are not to be construed as representative of a particular porosity structure or arrangement. In FIG. 1B, it is shown that the fiber 16 can include one or more hollow domains 18, which can be central or non-centrally located in the cross section of the fiber, with one or more porous domains 12 included in the fiber adjacent to or separate from the hollow domains, and fiber material 14 included among the domains. Further, as shown in FIG. 1C, a fiber 20 can include one or more solid domains 14 and hollow domains 18 along with one or more porous domains 12. As shown in FIG. 1D, a plurality of porous domains 12 can be included in any selected configuration in a fiber 22, with other domains, such as a hollow 18, along with solid fiber material 14.

Figure 2:
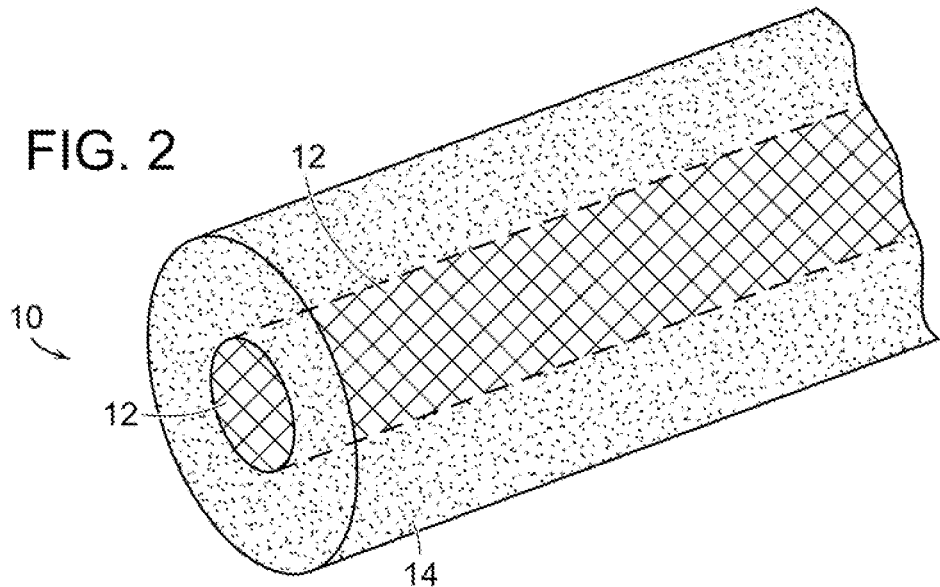
FIG. 2 is a schematic perspective view of the thermally drawn fiber of FIG. 1A.

In each of the porous fibers of FIGS. 1A-1D, the porous domain 12 of the fiber extends continuously along at least a portion of the longitudinal length of the fiber, i.e., along the long axis-direction of the fiber, as shown in FIG. 2 for the fiber configuration of FIG. 1A. The porous fiber domain preferably extends along the operationally-active length of the fiber. The fiber can have an operationally-active length that is on the order of meters, e.g., 100 m or longer. One or more non-porous domains of the fiber, such as solid fiber material, can be longitudinally continuous or longitudinally discontinuous along the fiber length, but the porous domain or domains of the fiber are longitudinally continuous along at least a portion of the fiber, and preferably along the operationally-active length of the fiber.

Each porous domain of the fiber includes regions of at least two distinct material phases, namely, the regions of solid-phase material and the fluid-phase regions, that together impart the porous structure to the domain. The solid phase can be provided as any suitable solid, e.g., organic or inorganic solid, that can be thermally drawn from a fiber preform into a fiber. The fluid phase can be provided as a high-viscosity fluid like a liquid, and alternatively can be provided as a low-viscosity fluid like a gas, such as air.

Figure 3:
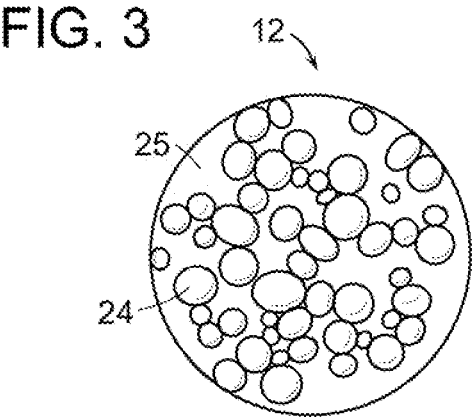
FIG. 3 is a schematic cross-sectional view of the material structure in a porous domain of a thermally drawn fiber.

In the porous domain of the fiber, the solid-phase material and/or the fluid-phase regions can be interconnected, within that phase, separate from the other phase, in one or more directions, such as along the domain length and across the cross-section of the domain. For example, referring to FIG. 3, showing a cross-section of a porous domain 12, regions 24 of a first of the two phases of the porous domain are interconnected in one or more directions. Regions 25 of the other of the two phases of the porous domain are arranged as interstices 25 or pores around the regions 24 of the first phase in the domain 12. The two distinct phases are interconnected within that given phase, separate from the other phase, in at least one direction, and preferably in at least two directions. As shown in FIG. 3, there is no requirement for order or periodicity in interconnections, and not every solid-phase structure or pore need be interconnected. Equal spacing between interconnected regions is not required. Each phase is interconnected separate from the other, and only a portion of each phase can be interconnected. There does not need to be interconnection in both of the phases.

In one arrangement of the porous domain, both solid-phase material regions and fluid-phase regions are present in all directions of the domain, and thus, both of the solid-phase and fluid-phase are present in all directions of the domain. With this arrangement, a continuous multi-directional path, e.g., a path in two directions, and preferably in at least three directions, is formed through the length of the domain by interconnected regions of one of the phases. This interconnected phase of the porous domain can include one or more materials, substances, or species that provide an interconnected path of a prespecified functionality through the fiber by way of the network of interconnected regions of one or both phases in the porous domain.

As shown in FIG. 3, regions 24 of one of the phases in the porous domain 12 can have a characteristic geometry, such as a generally spherical geometry, with the surrounding regions 25 filling the remaining space in the domain 12. As explained above, one of the two phases in the porous domain can be a solid and the other of the two phases in the porous domain can be a liquid, such as a fluid or a gas. Either of the regions of the porous domain, such as the generally spherical regions 24 or the interstitial regions 25 shown in FIG. 3, can be a solid or can be a fluid, such as a liquid or a gas. Thus, the interstitial regions 25 can be fluid-phase regions such as air or liquid, separating solid-phase spherical regions 24. Alternatively, the spherical regions 24 can be fluid-phase regions such as air or liquid, separating solid-phase interstitial regions 25. In either scenario, fluid-phase regions separate solid-phase regions. As explained above, either or both of the fluid-phase and solid-phase regions can be separately interconnected to provide a continuous path along the porous domain through regions of that phase.

If a continuous path of interconnectivity in one of the phases extends in substantially all directions, then isotropic porosity is provided in the porous domain. This scenario can be provided by the configuration shown in FIG. 3, where the population of interconnected spherical regions 24 defines a population of interconnected interstices 25 there between. In other words, the spherical regions 24 define an interconnected set of interstices, or pores 25. The network of spherical regions 24 and the network of interstices 25 are each three-dimensional, with an isotropic interconnected path in the interstices, or pores, that is three-dimensional, and similarly, an isotropic interconnected path through interconnected spherical regions.

With no particular directionality to the isotropic porosity, and no preferred direction to the interstices and solid-phase material arrangement, both transverse and longitudinal porosity can be achieved along the porous domain through the fiber length and across the domain cross-sectional extent. Both transverse and longitudinal functionality can thereby be provided in the fiber through one or more interconnected paths of the porous domain in the fiber. As a result, the porous fiber provided herein can be employed in a wide range of applications, including, e.g., as a filtration or separation column, as in chromatography systems, as a low-density material for thermal insulation, as a fluidic chamber for controlled storage and release of material as a drug delivery system, as a scaffold structure for growth such as in tissue engineering, or other configuration employing porosity. Enhanced mass transport or diffusion is enabled by the porous fiber, and with the methodology described in detail below, the porosity can be controlled to in turn control the rate of mass transfer for a wide range of applications. All of electrical, mechanical, and chemical functionality can be provided in the porous fiber. The porous fiber can be configured, e.g., as a battery, as a drug delivery system, as a chemical reaction chamber, as a sensor, or other functional structure. Along with such functionality, the porous fiber can transmit optical and/or electrical signals through the length of the fiber with regions that are included in the fiber for such transmittal, as explained below.

Considering this wide range of applications, each porous domain of the fiber can be formed to include a path of interconnected regions having a selected functionality along a continuous length of fiber. The interconnected regions can therefore enable conduction or transmission of energy along a continuous length of fiber, through the interconnected regions, as in conduction or transmission of heat, electrical charge or electricity, sound pressure, or other form of energy. This conduction of energy can occur through the solid-phase material of the porous domain, through the liquid-phase regions of the porous domain, or through both the solid-phase and liquid-phase regions of the porous domain.

Each of the two material phases in the porous domain of the fiber can be provided with any suitable geometry. Spheres, ellipsoids, fibrous structural arrangements such as struts or other elongated members, or other shapes, that need not be symmetrical, and pores, including nanopores, passages, openings, and other geometry can be included in the porous domain. The porous domain can take on a cellular foam structure, such as structural struts interposed with cavity regions, in an open cell foam structure. The pores, interstices, and other passageways can be voids or cavities, having any suitable geometry, and extending, e.g., from tens of microns down to nanometric scale. Interconnected spherulite structures with interstitials. Solid shapes that are fibrils, as in a open foam structure, or other solid material shape can be employed. The solid-phase regions further can take on any suitable morphology, such as amorphous or crystalline, including semicrystalline, polycrystalline, or other morphology. Further, the composition of each phase can determine the morphology and geometry of that phase's regions. For example, solidified polymer spheres can be formed as spherulites, which are spherical semicrystalline regions. Thus, a selected geometry can be imposed on the solid-phase material by control of composition.

A fiber including one or more porous domains along the fiber length can be produced by any suitable process. One particularly well-suited fiber manufacturing method is thermal drawing of a fiber preform into a fiber. In this thermal drawing method, in a first step, there is assembled a fiber preform. The fiber preform includes selected materials arranged in a macroscopic geometric configuration corresponding to, though not necessarily equivalent to, the desired geometry of the fiber to be thermally drawn from the fiber preform. The fiber preform can include solids and fluids, including liquids, to be thermally drawn into a fiber including one or more porous domains as described above. The fiber preform is characterized by a ratio of longitudinal to cross sectional dimensions that is typically between about 2 and about 100.

Once assembled, the fiber preform is exposed to heat and tension to thermally draw the fiber preform into a fiber that preserves the cross sectional geometric configuration of the macroscopic fiber preform while reducing fiber preform feature sizes to smaller scales while producing extended fiber lengths of uniform cross section. The fiber has a length on the order of meters, e.g., 10 m, 20 m, 50 m, 100 m, or longer, and a diameter on the order of between about 50 μm and about 2000 μm, resulting in a longitudinal-to-cross sectional ratio that can be above 1000, a length that can be more than 100 times greater than that of the fiber preform, and a diameter that can be 10 times less than the diameter of the fiber preform. Within the fiber, feature sizes on the order of 10's of nanometers can be produced. The thermal fiber drawing process preserves the fiber preform's element organization along its length while forming intimate material interfaces and reducing element sizes to the micro- and nano-scale along the fiber length.

Figure 4A:
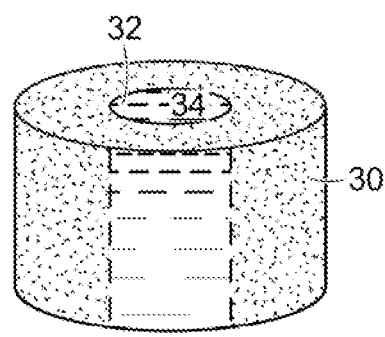
FIGS. 4A-4C are schematic views of a fiber preform including a liquid solution for producing a porous domain in the fiber, a fiber preform including the liquid solution as the fiber preform is drawn into a fiber, and a fiber preform entering a fiber draw zone and exiting the draw zone with the liquid solution transformed into a porous domain in the fiber, respectively.

Referring to FIG. 4A, in one method for producing porous fiber domains during the thermal drawing of a fiber preform into a fiber, the fiber preform 30 is arranged to include one or more hollow regions 32 that are each filled with a liquid solution 34 of multiple liquid components that can undergo a thermally-induced phase separation from liquid into two distinct material phases such as solid and fluid phases. Such a phase separation can be induced by, e.g., a temperature transition from a first temperature above the solution's phase transition temperature to a second temperature that is below the solution's phase transition temperature. This temperature transition can be imposed by the fiber preform drawing process so that the porous fiber domain is produced simultaneously with the drawing of the fiber.

Figure 5A:
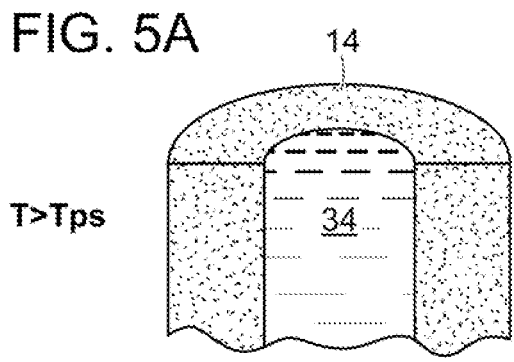
FIGS. 5A-5B are schematic cross-sectional views of a fiber including a liquid solution at a temperature above the phase separation temperature of the solution, and a fiber including a porous domain that has been formed by reduction in temperature below the phase separation temperature of the solution, respectively.
Figure 5B:
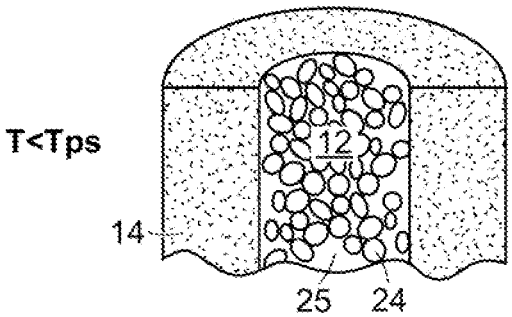
Figure 4B:
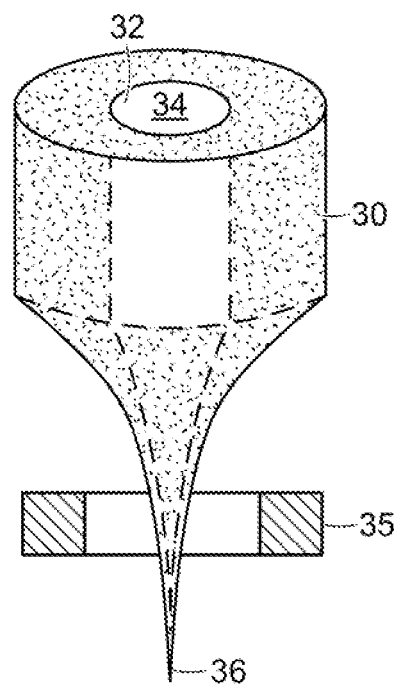
Figure 4C:
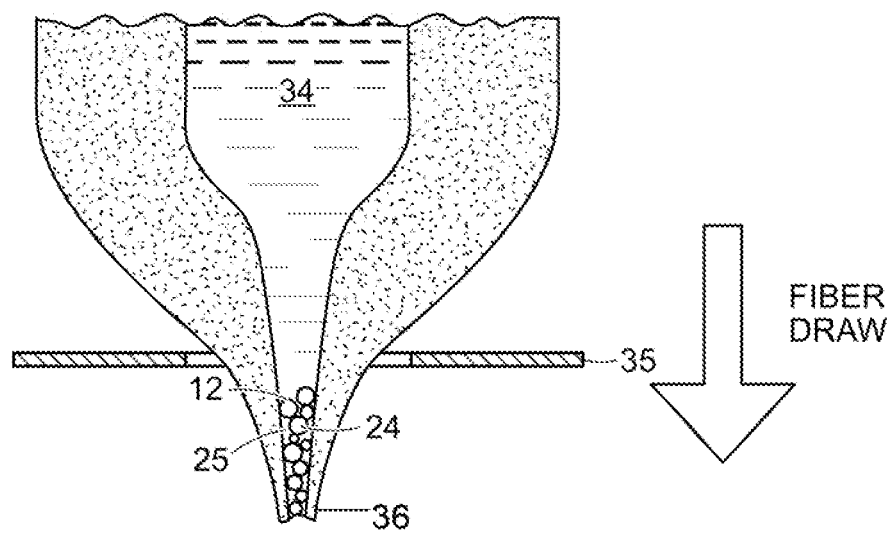

As shown in FIGS. 4B-4C, in general, when the fiber preform 30 is subjected to a thermal fiber drawing process by drawing through a heating zone 35 that is at a fiber drawing temperature, the application of heat and tension to the fiber preform causes the preform to be drawn into a fiber, with the liquid solution 34 maintained in the hollow regions of the drawn fiber as the fiber drawing process proceeds. As shown in FIG. 4C, as the fiber is drawn, there is maintained the liquid solution 34 while the drawing moves the fiber out of the high-temperature drawing zone. During and/or after this movement out of the high-temperature drawing zone, the fiber cools from the draw high-temperature, and the liquid solution is, by this cooling, induced to undergo a phase separation into two separate phases. One of the two phases solidifies, while the other phase is a fluid, resulting in a two-phase porous domain 12. The solidified phase produces solid regions, such as generally spherical regions 24, or other solid material structure, in which are provided fluid regions of the non-solid phase, such as pores or interstices 25, as in the cross sectional view of FIG. 3. The resulting thermally drawn fiber 36 thereby includes one or more porous domains 12 that are produced by the thermal fiber drawing process itself. No post-draw processing is employed to produce the porosity of the porous domains. FIGS. 5A-5B define the resulting two conditions of the fiber during the fiber drawing process. In the first condition, shown in FIG. 5A, the fiber includes fiber material 14 and one or more domains containing a liquid 34. This first condition is defined for temperatures, T, that are greater than or about the phase transition temperature, $T_{ps}$, of the liquid 34 in the fiber. In the second condition, shown in FIG. 5B, the fiber includes fiber material 14 and a porous domain 12 having solid phase material and fluid-phase regions, 24 or 25. This second condition is defined for temperature, T, that are less than or about the phase transition temperature, $T_{ps}$, of the liquid 34 in the fiber.

Figure 6:
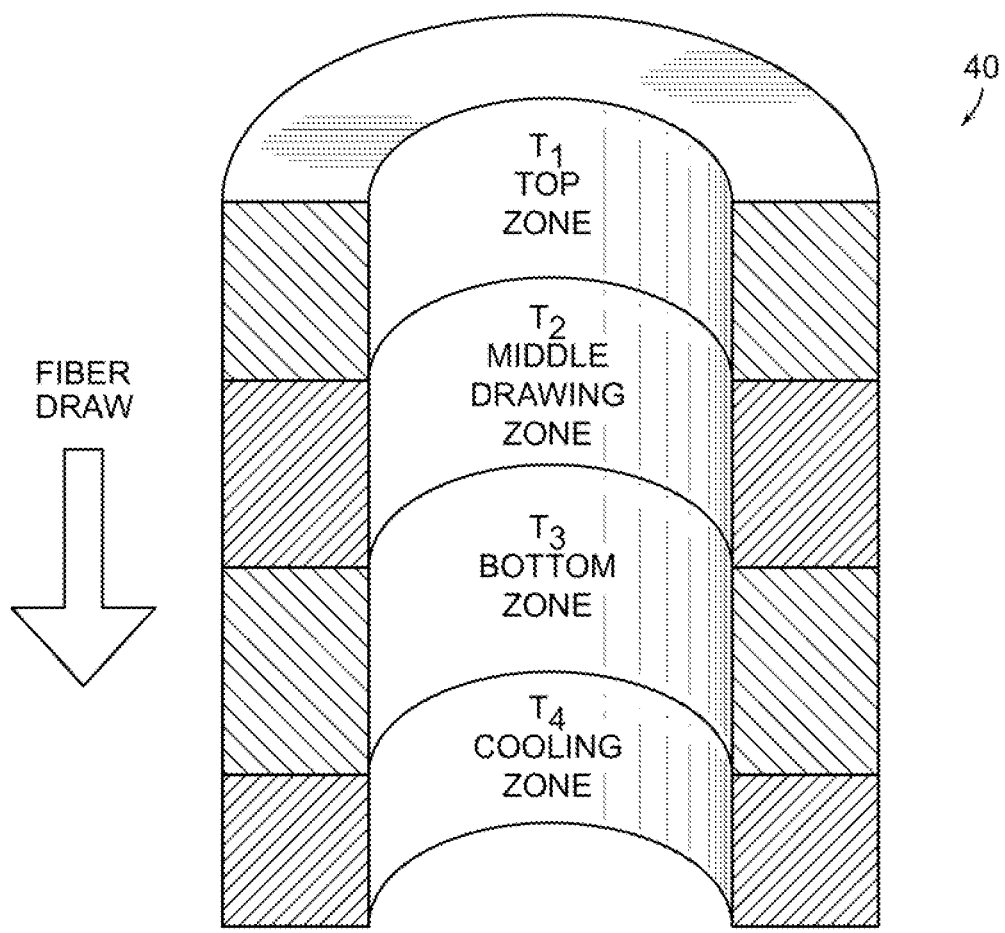
FIG. 6 is a schematic view of a fiber draw tower having four independent heating zones.

Referring to FIG. 6, the fiber preform-to-fiber thermal drawing process to produce this phase transition can be carried out in a conventional three-zone vertical fiber drawing furnace 40, shown schematically in FIG. 6. The vertical drawing furnace includes at least three temperature zones, with the temperature of each zone controlled independently. The zones can include a top zone, at temperature $T_1$, a middle drawing zone, at temperature $T_2$, a bottom zone, at a temperature $T_3$, and a cooling zone, at a temperature $T_4$. The top zone is set to a temperature, $T_1$, and is the zone at which the fiber preform enters the draw tower. That is, the temperature of the top zone, $T_1$, is the temperature at which the fiber preform resides before it is thermally drawn into a fiber under mechanical tension. The top zone temperature, $T_1$, is sufficiently higher than the threshold phase separation temperature, $T_{ps}$, of the liquid solution in the fiber preform, such that the solution is kept in a homogeneous state in the fiber preform before it is thermally drawn into a fiber.

The temperature of the middle drawing zone, $T_2$, of the fiber draw tower, is the fiber draw temperature and is the hottest temperature of the fiber drawing tower 40. This is the location in which the fiber is thermally drawn. The term "fiber draw temperature" is herein meant to refer to the temperature at which the middle drawing zone of the draw tower is set.

The temperature of the bottom zone, $T_3$, is the temperature imposed on the fiber before the fiber exits the heated furnace zones. The bottom zone temperature $T_3$ enables control over the mechanical properties of the fiber as the fiber exits the furnace, as well as control over the cooling rate of the fiber. The bottom zone temperature $T_3$ can be above or below the phase separation temperature, $T_{pa}$, but is below both the middle drawing zone temperature, $T_2$, and top zone temperature, $T_1$. Thus the bottom zone temperature is also the lowest temperature of all three heated zones of the furnace. The bottom zone temperature, $T_3$, is herein defined as a temperature that is sufficiently lower than the characteristic threshold phase separation temperature, $T_{ps}$, of the liquid solution, such that phase separation of the components in the solution occurs. The bottom zone temperature can be unregulated, and if unregulated, is typically, e.g., about 100° C., due to the proximity of the bottom zone to the middle drawing zone.

The cooling zone, having a cooling zone temperature, $T_4$, is an optional zone that can be imposed in any suitable manner with any suitable apparatus. The cooling zone can be at ambient room temperature, outside of the draw tower. The cooling zone can be an additional zone in the draw tower, or can be a controlled-temperature apparatus that is disposed in series with the draw tower for procession of the fiber there through. The cooling zone temperature, $T_4$, can be at room temperature, above room temperature, or below room temperature. The cooling zone can impose active cooling, or can employ passive cooling, e.g., passive cooling by convection in ambient. No cooling zone apparatus or specific cooling zone in the draw tower is required, and is shown in FIG. 6 only for clarity. But active cooling systems can be employed. With these zone temperatures, there are imposed the following temperature conditions: $T_2>T_1>T_3>T_4$, and $T_2>T_1>T_{ps}>T_3$.

Considering each temperature zone in detail, the top zone temperature, $T_1$, is sufficiently higher than the threshold phase separation temperature, $T_{ps}$, of the liquid solution in the fiber preform, such that the liquid solution is maintained in a homogeneous liquid state in the fiber preform before the fiber preform is thermally drawn into a fiber. The top zone temperature is generally lower than the fiber draw temperature, $T_2$, so as to avoid softening and maintain the structural integrity of the fiber preform before the fiber preform is drawn into a fiber. The fiber draw temperature, $T_2$, is also higher than the phase separation temperature, $T_{ps}$, so that the liquid solution in the fiber preform is homogeneous as the fiber preform is drawn into a fiber. The middle zone temperature $T_2$ can be as high as 200° C. above the phase separation temperature of the liquid solution, $T_{ps}$. The fiber draw temperature, $T_2$, is also sufficiently higher than the glass transition temperatures and/or melting temperatures of all the solid components of the fiber preform, so that the viscosity of all solid materials is low enough to allow the flow of the fiber preform solid materials into a fiber, when subjected to tension. The bottom zone temperature, $T_3$, is lower than the middle zone temperature, $T_2$, such that the components of the fiber are sufficiently stiff when the fiber exits the furnace. The bottom zone temperature, $T_3$, also enables control over the cooling rate of the fiber. The cooling zone temperature, $T_4$, can be imposed to further control the cooling rate of the fiber. At this point, the fiber can be wound, e.g., around a capstan, ready for use.

To achieve phase separation of the fiber preform's liquid solution in concert with the fiber drawing process, solvents in the liquid solution should be characterized by boiling points that are lower than the fiber draw temperature. The component of the solution that solidifies during the phase transition should remain dissolved at a temperature around the fiber drawing temperature. The phase transformation temperature, $T_{ps}$, of the solution should be above room temperature, to ensure that the solution is phase-separated at room temperature. The phase separation temperature, $T_{ps}$, is lower than the fiber draw temperature, $T_2$, by up to 200° C. The fiber preform's liquid solution is also preferably fully compatible with the fiber drawing process. The components of the liquid solution should be mechanically and chemically compatible with the other fiber materials on the whole range of temperatures from $T_4$ to $T_1$, e.g., the solution components should not dissolve the other fiber materials at any temperature within the range from $T_4$ to $T_1$.

For many applications, the liquid solution can include a component that can be dissolved in a solvent to form a liquid solution, and that upon phase separation can solidify into an interconnected solid-phase material while a liquid phase remains. Many materials can be employed as this dissolvable component. Table I below describes dissolvable polymers and solvents that can be employed in a fiber preform with a specified fiber material to form a porous domain in a fiber that is thermally drawn at a temperature in the indicated range of draw temperatures. The polymer-solvent pairs in Table I are examples of liquid solutions having a phase separation temperature that is lower than the fiber draw temperature, and therefore that enable fiber drawing with the liquid solution in place in the fiber preform during the fiber drawing. Two or more solvents can be included, as indicated in Table I, and further additives can be included in the solution as-needed for a given fiber application, as described below. For those solutions in Table I that include more than one solvent, a 1:1 weight mixture of the two solvents can be employed.

The components of a polymer-based liquid solution are not limited to simple polymer/solvent pairs. A combination of solvents can be employed with a single polymer. Similarly, a combination of polymers, and/or a blend of multiple polymers can be employed, e.g., with a single solvent, or with multiple solvents. Additives can be included in the liquid solution, for example, in the form of salts dissolved in the solvent, in the form of low molecular-weights molecular additives, in the form of inorganic particles, or as another suitable additive or component that can undergo the temperature-induced phase transition.

TABLE I

| Polymer | Solvent | Fiber Cladding | Fiber Draw Temperature Range |
|---|---|---|---|
| Polyvinylidene fluoride (PVDF) | Gamma-butyrolactone | Cyclic olefin Copolymer (COC) | 170° C.-190° C. |
| Polyvinylidene fluoride (PVDF) | Glycerol triacetate | Cyclic olefin Copolymer (COC) | 180° C.-240° C. |
| Polyvinylidene fluoride (PVDF) | Propylene carbonate | Cyclic olefin Copolymer (COC) | 180° C.-230° C. |
| Poly-caprolactone (PCL) | Dimethyl sulfoxide | Cyclic olefin Copolymer (COC) | 170° C.-180° C. |
| High-density polyethylene [HDPE] | Mineral oil | Acrylonitrile butadiene styrene (ABS) | 200° C.-240° C. |
| Polypropylene (PP) | Mineral oil | Acrylonitrile butadiene styrene (ABS) | 200° C.-240° C. |
| TPX ™ Polymethyl-pentene (PMP) | Mineral oil | Acrylonitrile butadiene styrene (ABS) | 200° C.-240° C. |
| Poly-caprolactone (PCL) | Propylene carbonate/ Triethylene glycol | Cyclic olefin Copolymer (COC) | 170° C.-190° C. |
| Poly-caprolactone (PCL) | Dimethyl imidazolidinone/ Triethylene glycol | Cyclic olefin Copolymer (COC) | 180° C.-240° C. |
| Poly-lactide (PLLA) | Propylene carbonate/ Triethylene glycol | Cyclic olefin Copolymer (COC) | 180° C.-230° C. |

For selected components of a liquid solution to be employed for forming a porous fiber domain, two parameters can be controlled to produce a selected porous domain structure. The first parameter is the cooling rate from the fiber draw temperature. In general, the faster the cooling rate, the smaller the regions of solid-phase material, and the larger, more interconnected, the interstices around the solid regions; while the slower the cooling rate, the larger the solid regions and the smaller, less numerous, the interstices around the solid regions. The specific microstructure, including porosity, pore size, and size distribution, pore shape, and solid material shape and size, are all dictated by the interplay between the thermodynamics and kinetics of the phase transformation. At the limit of very low cooling rates, regions of solidifying material have sufficient time at elevated temperatures to rearrange in minimization of surface area, through coarsening of the phase-separated solid regions. At very high cooling rates, regions of solidifying material are quenched into the phase-separated state without rearranging. Thus, the cooling rate can be controlled to tune the phase-separated structure of the porous domain. Referring back to FIG. 6, the cooling zone and cooling zone temperature, $T_4$, are controlled if desired to impose specific cooling conditions as the fiber is drawn out of the drawing zone and bottom zone. Ambient convective cooling in room-temperature air can be employed. A hot-air apparatus zone can be employed for imposing slow convective cooling. Liquid cooling can also be employed. A cold water bath, or cold air zone, e.g., can be employed to impose rapid quenching on the fiber as the fiber is withdrawn from the fiber draw zone.

The other controllable parameter is the volume fraction of material that solidifies upon phase transition. In the case of a polymer/solvent solution, the free energy of the solution can be specified in terms of temperature, polymer volume fraction, molecular weight, and an interaction parameter between the polymer and solvent molecules. From this free energy it is possible to construct phase diagrams for the solution, provided a measure of the interaction parameter is determined, and such phase diagrams can be referenced in the open literature. With such a phase diagram, the volume fraction of solidifying material can be selected to achieve a selected solid-liquid phase separation process or liquid-liquid phase separation process followed by polymer crystallization. For example, for all of the polymer-solvent solutions described in Table I above, a solution composition of about 20±5% weight polymer in solvent can be employed.

Considering now the other materials included in the porous fiber, there can be included electrically semiconducting materials, electrically conducting materials, and electrically insulating materials, all of which are co-drawn from the fiber preform into the porous fiber. Such electrically conducting, electrically insulating, and electrically semiconducting materials and elements can be included at points along the fiber length or extending the length of the fiber. Any materials that are chemically, thermally, and mechanically compatible for codrawing from a fiber preform can be included, preferably in an arrangement that maintains the geometric integrity of the fiber preform during the fiber draw.

Metals, polymers, glasses, including semiconducting glasses such as chalcogenides, semiconductors, and other materials can be included. Polymers, plastics, glasses, oxides, metals, and semiconductors, are examples of classes of materials that can be included in the porous fiber. In addition, composite polymeric materials, e.g., composed of a polymer binder in which a set of particles of inorganic or organic materials are dispersed, can also be included in the fiber. Optical transmission elements, electrical transmission elements, electrical and optical devices, and other elements and features can be included in the fiber, as described, e.g., in U.S. Pat. No. 7,295,734, issued Nov. 13, 2007, the entirety of which is hereby incorporated by reference.

It is to be understood that some experimental verification may be required to confirm the co-drawing compatibility of various candidate fiber materials. Once the drawing temperature of each material of interest is determined, and assuming that the materials can be drawn within a common temperature range, it can be prudent to examine the viscosities of the materials across the selected drawing temperature range to ensure that the viscosities are compatible. It is not required that the viscosities of the various materials be the same at the fiber draw temperature, but rather that all materials should at least flow at the draw temperature while being thermally stable at the draw temperature. Electrically conducting materials, such as metals, are preferably molten at the draw temperature. Also, it can be preferred that the fiber material which comprises the majority of the volume of the fiber preform, including an outer cladding material, be characterized by the highest viscosity.

For example, a reasonable criteria for a fiber preform including a high glass-transition-temperature polymer fiber material, is that all materials have viscosities lower than about $10^8$ Poise at the selected draw temperature, with metals preferably being molten at the selected draw temperature. If, e.g., a polymer fiber material constitutes the majority of the fiber preform volume, then a polymer viscosity of between about $10^1$ Poise and about $10^8$ Poise can be acceptable, with a viscosity of between about $10^4$ Poise and about $10^7$ Poise preferred, all at the fiber draw temperature. In this example scenario, a viscosity of less than about $10^8$ Poise can be acceptable for glassy and conducting materials included in the fiber preform, with a viscosity of less than about $10^8$ Poise preferred.

Assembly of all selected materials into a fiber preform is carried out employing processes that are compatible with the selected materials to produce desired material configurations based on the considerations described above. No particular preform assembly technique is required. Rather, a range of techniques can be employed to produce a preform having a configuration corresponding directly to the desired post-draw fiber including at least one porous domain. Any in a variety of preform elements can be provided and/or produced separately for incorporation together into a preform arrangement.

Considering first electrically conductive materials, there can be included in the preform commercially-available rods, strands, foils, sheets, and other articles of conducting material. In addition, thermal evaporation, E-beam evaporation, sputtering, chemical vapor deposition (CVD) and other physical deposition techniques can be employed for coating preform elements with a conducting material layer or layers. It is to be recognized, however, that depending on a particularly selected deposition technique and the deposition parameters, not all deposited films may be compatible with a fiber co-drawing process; e.g., the deposited conducting material must be sufficiently thick as well as ductile to accommodate the drawing process. Whatever electrically conducting material geometry is employed, it is preferred that the conducting material be molten at fiber draw temperatures. Therefore, it is preferred that the metal or alloy be arranged in the fiber preform such that the metal is confined geometrically in the preform. This metal confinement ensures that the draw process retains the desired metal configuration in the fiber even while the metal is in a molten fluid state.

Considering electrically insulating fiber preform elements, due to the relative ease of preform assembly and drawing of insulating materials such as polymer materials, polymeric insulating materials can be preferred for many fiber applications. Polymeric insulating materials can be readily obtained commercially or produced in a desired configuration. For example, commercially available polymer rods, tubes, sheets, and films from, e.g., Westlake Plastics Co., can be employed. Polymer rods and tubes can also be produced by thermal consolidation of a rolled polymer film. Polymer layers can be produced by chemical vapor deposition techniques such as plasma enhanced chemical vapor deposition, by spin-coating, dip-coating, as described above, by roll-casting, extrusion, and other techniques. Liquid polymer can be applied, for coating preform core materials, strands, wires, rods, layers of other material, and preform elements. The fiber preform can include insulating materials beyond polymeric materials. So long as a candidate insulating material is characterized by a morphology that is compatible with fiber drawing, such can be employed in addition to or as an alternative to polymeric materials. Chemical and physical deposition techniques can be employed for producing non-polymeric insulating material preform elements.

Similarly, chemical and physical deposition techniques can be employed for producing amorphous semiconducting material preform elements. Rods, tubes, sheets, films, and other semiconducting structures can be employed in the fiber preform. Chalcogenide glasses, including semiconducting chalcogenide glasses, and other glasses can be included. A wide range of semiconducting glass structures can be obtained commercially, e.g., from Alfa Aesar, Ward Hill, Mass., and also can be synthesized as a particularly desired composition and geometry.

Milling, lathing, casting, injection molding, or other techniques can be employed for defining the geometric relationship between material elements in a preform layer or region. A hollow region or portions of a hollow region can be formed to define the porous domain of the drawn fiber and to contain a liquid solution for production of the porous domain. In addition, holes, trenches, and other features can be produced in a preform structure and elements such as electrically conducting or semiconducting strands or other elements fitted into the features. Sacrificial elements can also be included in a preform to aid in defining internal preform shapes, and then removed prior to drawing of the preform into a fiber. For example, quartz tubes or rods can be included in a preform at locations for which a hollow region is desired for production of a porous domain, and then chemically etched away after consolidation of the preform. Similarly, Teflon™ (polytetrafluoroethylene) rods or tubes can be included in a preform and mechanically removed from the preform after consolidation. This technique provides a particularly elegant method for defining gaps and spaces in a preform assembly in which to provide the liquid solution for production of porous fiber domains. With preform building blocks and processes like those described above, a wide range of preform geometries can be assembled for enabling optical and electrical functionality, including electrical and energy transmission and device operation, in a final fiber structure including porous domains.

Referring to FIGS. 7A-7E, fiber preform assembly to produce one or more porous domains in a thermally drawn fiber can employ any suitable materials in the manner described above. Bulk materials 50 as in FIG. 7A can be milled or otherwise processed to form selected preform components 52 as in FIG. 7B having internal geometry that includes, e.g., a hollow region 54 for containment of a liquid solution to be transformed into a porous domain of the fiber. The bulk material 50 can be baked or otherwise thermally processed, and the processed components 52 can be further processed, as in, e.g., annealing. Such thermal processes can be employed for, e.g., removing moisture from raw material, for relieving internal stresses that could cause fracture during the fiber preform drawing, or for purifying the material.

Figure 7A:
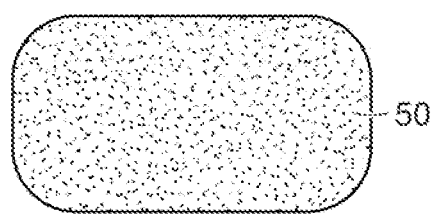
FIGS. 7A-7E are schematic cross-sectional views of method steps for producing a fiber preform including a liquid solution to be transformed into a porous domain of a fiber.
Figure 7B:
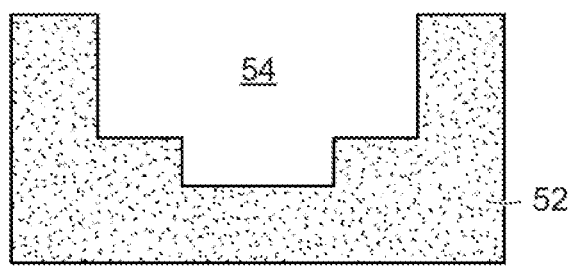
Figure 7C:
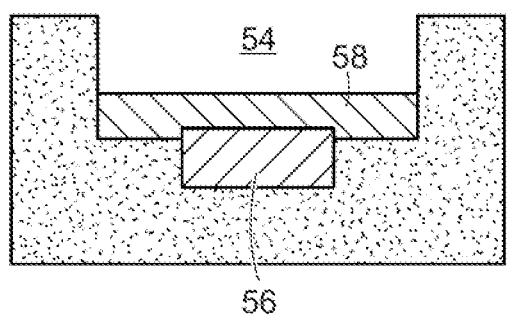
Figure 7D:
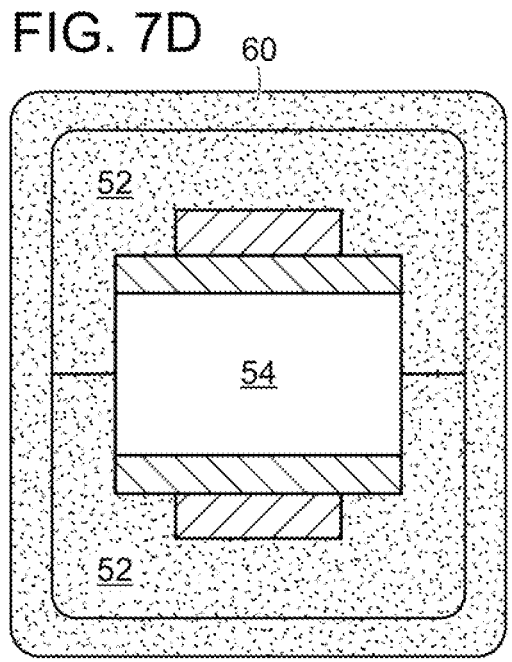
Figure 7E:
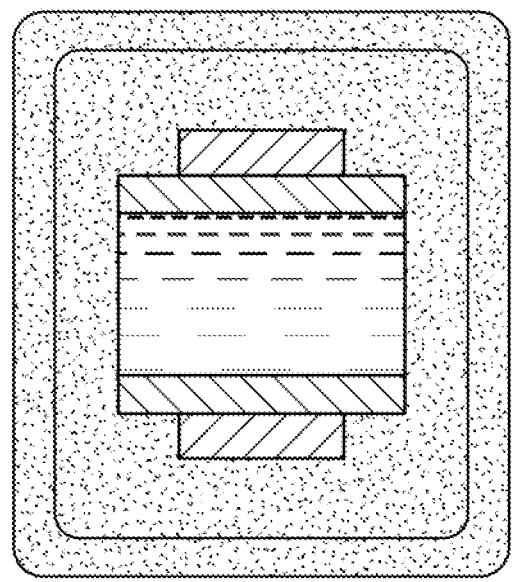

As shown in FIG. 7C, preform elements and materials can be assembled in any suitable geometry, including at the location of hollow regions 54. Preform elements such as those 56, 58 in FIG. 7C can be disposed at selected locations, such as at the hollow region 54. Hot pressing or other processing can be employed in assembly of such preform elements. Multiple preform components can then be assembled, such as the configuration shown in FIG. 7D, in which two components 52 are mated, to define an internally confined hollow region 54 that functions as a fiber preform reservoir for containing a liquid solution. The components 52 thereby provide in the preform a region of fiber material around the hollow region 54. Further assembly of materials in the preform arrangement can continue, to include further fiber elements in the preform, to add additional fiber and/or cladding material, or to further define the preform geometry. As shown in FIG. 7D, a layer or layers 60 can be wrapped around preform elements to provide additional fiber material, such as an outer cladding layer.

Depending on the selected preform assembly technique and resulting arrangement, it can be preferred to thermally consolidate an assembled preform prior to the fiber drawing process. Consolidation is a process whereby under heat and vacuum conditions one or more of the preform materials are caused to fuse together, with air pockets between adjacent materials in the preform being substantially eliminated. This results in a preform assembly that can produce intimate interfacial contact between adjacent material layers in the final fiber, and provides the preform with self-maintaining structural stability during the fiber draw process.

The specific conditions of the consolidation process are selected based on the particular materials incorporated into a given preform. If, e.g., a high glass-transition-temperature polymer is employed in the preform, then the consolidation temperature preferably is above the glass transition temperature of the polymer. The preform is maintained at the elevated temperature for a time sufficient to cause the polymer to fuse to adjacent elements included in the preform; the temperature is selected based on the preform diameter and its materials.

As explained above, in construction of a preform there can be included one or more sacrificial elements that are incorporated in the preform solely to define spaces or hollow regions to be provided in a final fiber geometry. For example, a mandrel, rod, or tube can be included in a preform where a hollow fiber core or other region is desired. If a sacrificial element is included in a preform, the sacrificial element it can be preferred that the consolidation process be carried out at a temperature below the glass transition temperature of that element, so that structural integrity of the sacrificial element is maintained during the consolidation process and the preform does not collapse on itself.

For many preform material arrangements, a sacrificial element can be constructed that can withstand reasonable consolidation temperatures and pressures and can easily be removed from the preform after consolidation. For example, Teflon™ (polytetrafluoroethylene) tubes, rods, or other elements can be readily incorporated into and removed from a preform. Any material that exhibits poor surface adhesion and can withstand the consolidation process is a good sacrificial element material. It is preferable to remove the Teflon™ or other sacrificial element after cooling the preform assembly from the consolidation process temperature. When the preform is hot and slightly expanded it can be difficult to slide out the sacrificial element. In contrast, after the preform has cooled slightly, the materials slightly contract, enabling ease of removal of sacrificial elements. Once the preform cools and correspondingly shrinks, it can be difficult, if not impossible, to remove the element by simple mechanical force.

Alternatively, sacrificial elements which can be removed from a consolidated preform by chemical etching can be employed. For example, glass, quartz, or other etchable materials that can withstand the consolidation process can be employed. In such a scenario, after the consolidation process, the preform is exposed to a chemical etchant that selectively attacks the sacrificial elements. For example, hydrofluoric acid or other acid bath can be employed for wet chemical etching of sacrificial elements. Dry etch techniques, e.g., plasma etch techniques, can also be employed if such can be adapted to contact and selectively attack the sacrificial materials in a preform.

With a preform assembly complete, the preform can be further arranged to include a plug or other feature that closes off an end or ends of the fiber at the location of the hollow region in which a liquid solution is to be contained. A fiber material plug of any suitable composition, e.g., the fiber cladding material, can here be employed. The preform assembly can then be heated to some temperature, e.g., a temperature that is close to the glass transition temperature of the fiber cladding material, which is the hottest temperature at which this material can be kept without losing its mechanical structure. At this high temperature, quenching of the liquid solution is avoided as the solution is introduced into the fiber preform.

The liquid solution to be provided in the fiber preform is prepared in any suitable method that renders the solution in a state in which phase separation of the solution does not occur. Specifically, the liquid solution is prepared at a temperature such that the viscosity of the solution is relatively low. This low viscosity-state of the solution enables incorporation into the preform simply by pouring, even if the preform is at a lower temperature then the solution. As stated above, the preform is preferably heated to close to the glass transition temperature of the fiber cladding to facilitate this incorporation, and to avoid rapid quenching and large viscosity increase of the solution during the pour. The upper limit for the temperature of the solution during preparation is the boiling point of the solvent or the decomposition temperature of the polymer or other component that is dissolved in the solution. Thus, the preform temperature is set at a temperature slightly lower than the glass transition temperature of the fiber cladding material, e.g., about 5° C. to about 50° C. below the glass transition temperature, and the solution preparation temperature is above the phase separation temperature that is characteristic for the solution, but below the boiling point of the solvent or the decomposition temperature of the polymer in solution, whichever temperature is lower. It is recognized that between the time that the liquid solution is poured into the preform and the time that the preform is set in the fiber draw tower, the liquid solution can phase-separate in the preform to some extent however small. It is for this reason that it can be preferred that the upper zone of the draw tower furnace be held at a temperature, $T_1$, that is above the phase separation temperature, so as to re-homogenize the liquid solution, if necessary, prior to the fiber drawing in the middle drawing zone of the draw tower.

For many applications, it can be preferred that the solution be prepared as a homogeneous mixture of components so that the phase separation occurs generally uniformly through the extent of the solution. For selected liquid solution components, the characteristic phase separation temperature of the solution can be determined in any suitable manner if such information cannot be obtained from available literature. Differential Scanning Calorimetry (DSC), and/or rheological measurements can be employed to determine the temperature or range of temperatures at which a liquid solution undergoes a phase separation.

The liquid solution is prepared by, e.g., mixing solution components in a reaction bottle that is heated at a temperature above the phase separation temperature. With a uniform solution obtained, the solution is introduced into the one or more hollow regions of the fiber for which a porous domain is to be formed. The preform is then preferably immediately thermally drawn, to maintain the thermal condition of the preform and the liquid solution therein.

As explained above and shown in FIG. 6, the fiber preform is drawn in, e.g., a vertical tower furnace having a top zone, middle drawing zone, bottom zone, and if desired, cooling zone. Below the furnace is provided a capstan with spooler for spooling the drawn fiber under tension. Measurement equipment, e.g., a laser diameter monitor, from Beta LaserMike, Dayton, Ohio; fiber tension measurement devices, e.g., Model SM9649P, from Tension Measurement, Inc., of Arvada, Colo., and other monitoring equipment can be included.

The fiber preform downfeed speed and capstan speed are selected based on the preform materials and configuration to enable co-drawing of all fiber materials and the liquid solution. As explained above, the draw temperature is selected to be above the glass transition temperature of the insulating and semiconducting materials, and for most material combinations, above the melting temperature of the conducting material. If an excessively high draw temperature is employed, the preform will catastrophically deform, while an excessively low draw temperature will cause preform distortion and expansion. The structural arrangement of the preform must be preserved at the draw temperature.

For many applications, it can be preferred to ensure uniform heating of the preform in each zone of the drawing tower. Uniformly heated furnace zones employing, e.g., distributed filament heating, are particularly well suited for the drawing process. It is further preferred that the fiber preform be maintained laterally centrally in the drawing temperature zone. If the fiber preform temperature distribution becomes nonuniform due to lack of furnace temperature control or lateral misalignment of the preform as the fiber preform passes downward through the drawing zone, there could be produced local fiber preform regions of differing temperature and differing viscosity. Local viscosity fluctuations in the preform could produce a capillary effect in which material, particularly molten metal, flows to other preform regions, and distorts the intended fiber geometry. Lack of furnace zone temperature control could also cause unintended phase separation of the liquid solution prior to completion of drawing of a fiber region.

The combination of preform downfeed speed and capstan drawing speed determine the diameter of fiber produced by the drawing process for a given drawing temperature. A diameter monitoring system can be configured in a feedback loop to enable control of, e.g., the capstan speed, by the diameter monitors based on a diameter setpoint and control algorithm. Within the fiber, layers of the fiber preform are reduced in thickness by a factor of ~20-100. A fiber preform can be drawn multiple times to reduce the final resulting fiber geometry correspondingly. The drawdown ratio between a fiber preform and the resulting fiber is not precise; specifically, the preform layer thickness drawdown ratio does not always correspond precisely to the fiber's outer diameter drawdown ratio. This can be due to a number of factors, including, e.g., reduction of the liquid-filled regions within the fiber preform. The relationship between the layer and outer diameter drawdown ratios is found to be closer to 1:1 for large-diameter, low-tension draw procedures. High-temperature, low-tension draw procedures can tend to produce fibers having layers thicker than predicted by the outer diameter reduction ratio, due, e.g., to partial collapse of hollow regions. It is found, however, that such effects are fairly reproducible and can be predicted based on experimental history.

Upon completion of the fiber drawing operation, there is produced a fiber having one or more porous domains that include solid-phase material and fluid-phase regions, such as a liquid or a gas. After fiber drawing, then if desired, liquid or gas in the fluid-phase regions of the porous domain or domains of the fiber can be displaced from the drawn fiber. In other words, after thermal drawing of the fiber preform into a fiber including a porous domain, the resulting fiber can be subjected to a post-draw process that removes fluid, such as liquid or gas, from the porous domain. In the case of liquid that is disposed in the porous domain, the liquid can be evaporated or suctioned from the porous domain. In the case of a gas, the gas can be evacuated from the porous domain.

With the as-drawn fluid removed from the porous domain of the drawn fiber, one or more liquids or gases can be introduced into the porous domain to provide a selected porous domain composition that may not be achieved by the fiber drawing process. In this scenario, the fiber preform can be assembled to include a liquid solution having a first component, such as a polymer, that is dissolved in a solvent which is compatible for co-drawing in the fiber preform but may not exhibit properties that are required for a given application. After thermal draw of the fiber to include a porous domain having solid polymer material regions and liquid regions from the solvent, the solvent can be evaporated out of the porous domain. The solvent can then be replaced with a selected liquid that is desired for a given application. The solvent employed in the liquid solution in the fiber preform thereby functions as a sacrificial solvent that enables production of a porous fiber domain during the fiber draw process, and that is removed from the porous fiber domain after the fiber draw process. This post-draw processing enables the provision of a wide range of liquids and gasses in the porous domain of the fiber, including liquids and gasses that may not be compatible with the thermal drawing process. Thus, the thermal drawing process can produce a porous domain in a fiber, and then the composition of the porous domain can be tailored after the porous domain formation.

The porous fiber configuration thereby enables a very wide range of functionality along the length of the fiber, with a wide range of material compatibility. As explained above, the fiber components can be tailored for a selected transmission, e.g., transmission of energy. The porous fiber can include materials for operation as a porous fiber battery, as described in detail below. In this example configuration, there can be included in the porous fiber selected materials for achieving battery functionality, e.g., an electrolyte, electrically conducting current collectors, electrically conducting electrodes, and fiber material, with fiber cladding. The porous fiber battery can be formed in one step of fiber drawing from an assembled fiber battery preform. The single fiber drawing step produces a fiber battery that is electrically and electrochemically functional, and that is provided as the length of the drawn fiber.

Figure 8:
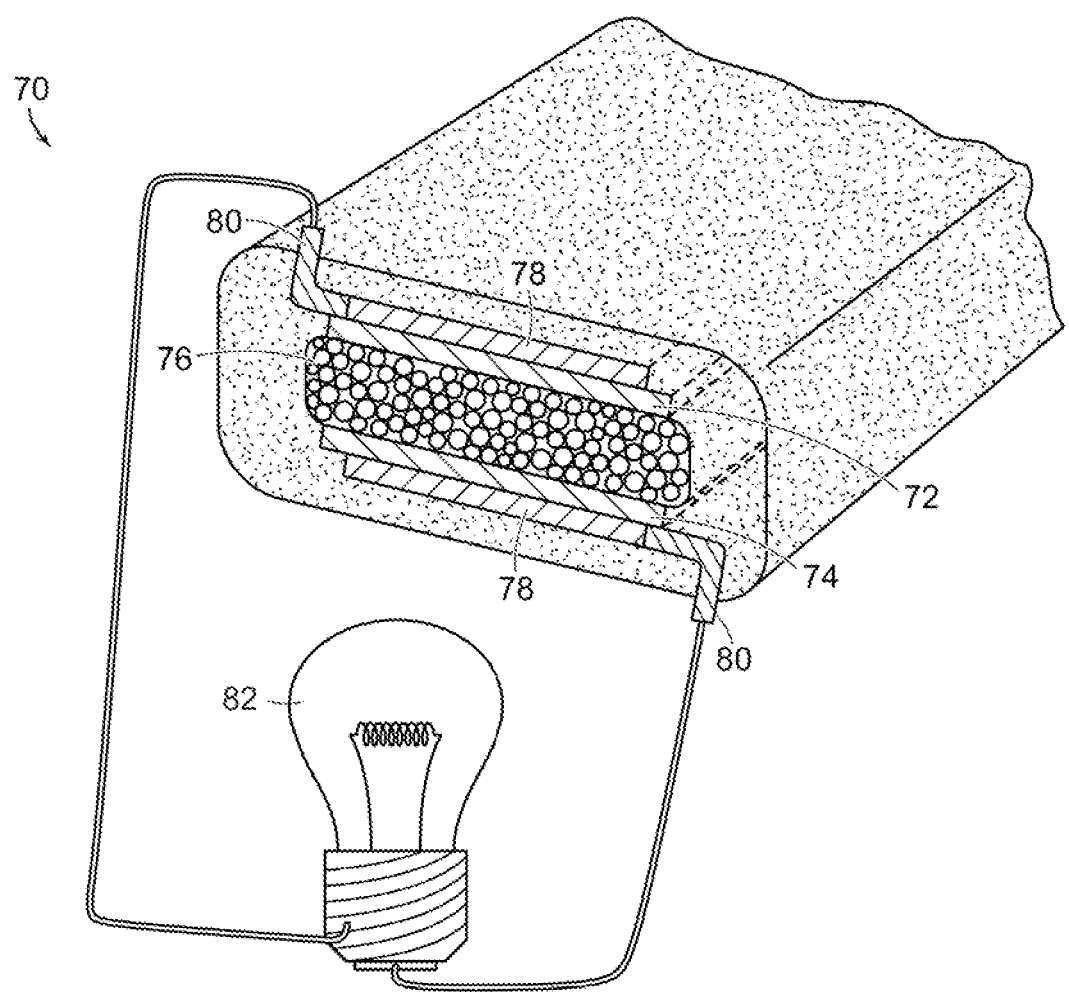
FIG. 8 is a schematic perspective view showing a cross-section of a fiber battery connected in a circuit to deliver electrical power to a circuit load.

FIG. 8 is a schematic perspective view showing a cross section of a fiber battery 70. As shown in FIG. 8, there can be included in the fiber battery an electrically conducting anode 72 and an electrically conducting cathode 74 that are separated from each other by an ionically-conductive domain 76 that is the porous domain formed in the manner described above during the thermal fiber drawing process. Electrical conduction along the length of the fiber is achieved with electrically conducting current collectors 78 connected to the anode 72 and cathode 74, and by electrically conducting lead wires 80. The lead wires enable configuration of the fiber battery with a load 82, to delivery power to the load. Fiber material 14 is included in the fiber battery around the other battery components and can include a variety of materials and elements to enable application of the battery for a specific operation. The fiber battery 70 can thereby be employed as a mechanically flexible electrochemical energy source and can be directly and conformally integrated at the site of and into objects having any suitable size and dimensions. As explained above, this is but one application of the porous fiber structure, and the porous fiber is not limited to inclusion of such particular materials. The fiber structure, including at least one porous domain, is in general applicable to any in a wide range of applications, and enables a range of fiber functionality that has heretofore been unachievable in a thermally-drawn fiber geometry.

In general, in operation of the fiber battery, during battery discharge, ions flow through an electrolyte that is provided in the ionically-conductive domain 76 from the anode 72 to the cathode 74 in FIG. 8. In a conventional battery arrangement, ions de-intercalate from the anode material during battery discharge, traversing the electrolyte to intercalate into the cathode material. The opposite process occurs during battery charging. In each case the driving force is the electrochemical potential difference between the anode and cathode. The flow of ions between the anode and cathode is accompanied by a counter flow of electrons through an external circuit and any loads that are included in the external circuit. This is achieved in the fiber battery with the current collectors 78 and connecting wires 80 that connect the fiber battery in a circuit including a load 82.

Considering now the fiber battery components, suitable anode and cathode active materials, like all of the fiber materials, exhibit thermal stability at the fiber draw temperature, and are chemically compatible with the other fiber materials and components at the fiber draw temperature. Suitable anode and cathode active materials also are electrochemically compatible with the other fiber components at room temperature. This is particularly preferred with regard to the components of the electrolyte, to ensure stable battery operation. The active anode material can be provided as, e.g., $Li_2TiO_3$, pure lithium, a tin-based metal alloy, graphite, synthetic graphite, silicon-based nanoparticles, or other conducting nanoparticles, or other suitable material. The active cathode material can be provided as, e.g., a layered lithium oxide such as $LiCoO_2$, $LiMnO_2$, $LiNiO_2$ or other layered lithium oxide that accommodates intercalation. The active cathode material alternatively can be provided as, e.g., a spinel lithium oxide such as $LiMn_2O_4$, $LiTi_2O_4$, $LiV_2O_4$, or other spinel lithium oxide. The active cathode material can also be provided as, e.g., a phospho-olivine such as $LiFePO_4$, or other suitable material.

Active anode materials and active cathode materials that cannot be thermally drawn into a fiber if such were present as a solid fiber preform component of such can be incorporated as particles in, e.g., a polymeric binder matrix. The resulting composite anode and cathode regions can be arranged in a fiber preform for thermal drawing into a fiber battery. The type and composition of such a polymer matrix can be adjusted to obtain anode and cathode structures that can be assembled into a fiber preform and then thermally drawn into the fiber battery. Further components can be added for increased electrical conduction through the composite anode and cathode structures, as described below.

A suitable anode binder material can be co-drawn with the other fiber materials, and exhibits thermal stability at the thermal fiber draw temperature. The anode binder material is also chemically compatible with the fiber materials and components at the fiber draw temperature. The anode binder preferably is chemically compatible with the electrolyte solvent, to which the anode is exposed during fiber drawing and during fiber battery operation. The anode binder material is also preferably electrochemically compatible with the other fiber components at room temperature. It is particularly preferred that the anode binder be electrochemically compatible with the electrolyte components and the anode active material, to enable stable battery operation. An anode binder of polyethylene, e.g., LDPE or HDPE, can be employed for many applications. Such a binder is available in various molecular weights and morphologies, thus enable wide control over rheological properties of the composite anode. Various polymers and polymer grades can be blended together to further tailor the properties of the composite anode. Whatever binder composition is employed, particles of the active anode material that are mixed with the binder material must be exposed on the surface of the composite electrode to enable intercalation and de-intercalation of ions into and out of the anode material.

It is recognized that some anode active materials do not require a binder for drawing. For example, pure lithium and tin-based metal alloys do not require a polymer binder to enable thermal drawing of these anode materials. Thus, a binder material is not required for all anode materials. If an active anode material can be co-drawn with the other fiber materials, then an anode binder material is not required.

A suitable cathode binder material, like the anode binder materials discussed above, can be co-drawn with the other fiber materials, and exhibits thermal stability at the thermal fiber draw temperature. The cathode binder material is also chemically compatible with the fiber materials and components at the fiber draw temperature. The cathode binder preferably is chemically compatible with the electrolyte solvent, to which the cathode is exposed during fiber drawing and during fiber battery operation. The cathode binder material is also electrochemically compatible with the other fiber components at room temperature. It is particularly preferred that the cathode binder be electrochemically compatible with the electrolyte components and the cathode active material, to enable stable battery operation. A cathode binder of polyethylene, e.g., LDPE or HDPE, can be employed for many applications. Such a binder is available in various molecular weights and morphologies, thus enabling wide control over rheological properties of the composite cathode. Various polymers and polymer grades can be blended together to further tailor the properties of the composite cathode. Whatever binder composition is employed, particles of the active cathode material that are mixed with the binder material must be exposed on the surface of the composite electrode to enable intercalation and de-intercalation of ions into and out of the cathode material.

With the active anode material or active cathode material and binder material there is added a material that provides sufficient electrical conductivity in the composite anode and cathode elements to enable flow of electrons between the anode and cathode elements and the corresponding current collectors. One such material additive is carbon black. Carbon black is particularly well-suited as an additive because carbon black allows for lithium diffusion from the surface to the bulk of the anode and cathode and into and out of active anode and cathode materials. It is preferred that the volume content of the carbon black be kept to a minimum to minimize the impact of this additive on the rheology of the anode and cathode elements and their compatibility for co-drawing with the other fiber materials. But the carbon black volume content must be sufficiently high such that carbon black particles form a percolate network within the anode and cathode composite structures. A volume content of between about 5% and about 20% can be suitable for many applications.

The current collectors, for conducting electrical current into and out of the fiber anode and cathode, can be formed of any suitable electrically conducting material that has a melting temperature below a selected fiber draw temperature. Being in physical contact with the anode and cathode elements, the current collectors are preferably chemically compatible with the anode and cathode materials, and are thermally stable and un-reactive with the anode and cathode materials at the draw temperature. Indium or indium alloys, tin or tin alloys, or other suitable electrically conducting material can be employed for the current collectors.

The electrolyte that is provided between the anode and cathode of the fiber battery is disposed in a structure that is a porous domain of the fiber as described above. Any suitable materials can be employed in the porous domain. A polymer like those described above and listed in Table I can be employed as the component in liquid solution that solidifies into solid-phase material below the phase transition temperature of the liquid solution. A suitable polymer can be dissolved into a liquid solution with an electrolytic solvent and can be thermally induced to phase-separate out of the solution into regions of solid-phase polymer material. Suitable polymers exhibit thermal stability and chemical compatibility with other fiber components at the fiber draw temperature, and particularly are chemically compatible with the anode and cathode elements. Similarly, the polymer is electrochemically compatible with other fiber components at the battery operation temperatures, and especially the components in the electrolyte, to ensure stable battery operation. Polymers such as PVdF, PVdF copolymers, or other polymer materials can here be employed.

The selected polymer is dissolved into a liquid solution with a solvent. Suitable solvents exhibit a boiling point that is lower than the draw temperature, and exhibit thermal stability and chemical compatibility with other fiber components at the fiber draw temperature. The solvent is to be chemically compatible with the anode and cathode elements, as well as the fiber material, including fiber cladding. Similarly, the solvent is to be electrochemically compatible with other fiber components at the battery operation temperatures, such as room temperature, and especially the components in the electrolyte, to ensure stable battery operation. Suitable solvents include carbonate esters, such as propylene carbonate, ethylene carbonate, dimethyl carbonate, and other such carbonate esters, as well as other solvents. Several solvents can be mixed together to obtain desired solvent characteristics. Other suitable solvents include lactones, such as gamma-butyrolactone, and sulfones, such as sulfolane.

Salts can be added to the solvent-polymer solution to provide electrolytes in the solution for fiber battery operation. Like the solvent, the salt is to be thermally stable at fiber draw temperature and to exhibit chemical compatibility with the other fiber components, particularly the anode and cathode, at the draw temperature. The salt should not prevent the phase separation of the liquid solution in the thermal drawing process. Suitable salts also exhibit electrochemical compatibility with the other fiber components at room temperature, especially with the anode and cathode, to ensure stable battery operation. Salt can be provided as, e.g., $LiClO_4$, $LiCF_3SO_3$, LiTFSI, $TEABF_4$, $LiBF_4$, LiBOB, or other suitable salt.

Additives can be incorporated into the electrolytic liquid solution as-desired for a given application. Such additives can be included, e.g., to enhance the chemical compatibility of fiber components at the fiber draw temperature, and/or to enhance the electrochemical compatibility of components at the fiber battery operational temperature, such as room temperature. Battery stability and performance can accordingly be improved by incorporation of additives that enhance the electrochemical compatibility of the electrolyte solvent and the anode active material. Additives must the thermally stable at the fiber draw temperature and be chemically compatible with the other fiber components at the fiber draw temperature, as well as electrochemically compatible with fiber components at room temperature. Additives such as lithium salts, like LiBOB, LiTFSI, or other salts, can be employed. Molecular additives, such as vinylene carbonate, dimethyl sulfite, or other such additives can also be employed. More than one additive can be incorporated to address various compatibility considerations.

The anode, cathode, current conductors, and porous domain of electrolytic solution are disposed with fiber material, such as cladding material that is provided around elements of the fiber. Suitable fiber cladding materials are chemically resistant to the electrolyte solvent at the draw temperature, and have the requisite viscosity at the draw temperature for co-drawing with the other fiber materials. Cyclic olefin copolymers, cyclic olefin polymers, or other suitable polymers can be employed for the fiber material, including fiber cladding material.

With these fiber battery materials considerations, a fully functional fiber battery, employing a porous fiber domain, can be produced. In one example, a liquid solution for production of the porous domain can be provided as PVdF in a 20:80 weight ratio with a 1M solution of $LiClO_4$ in propylene carbonate. The solution can be prepared, e.g., in a glovebox and homogenized at a selected temperature, e.g., 200° C., for a suitable duration, e.g., 3 hours. The solution can then be poured into a preform, e.g., a cyclic olefin copolymer preform assembly including a hollow region for the porous domain and including current collectors of tin or indium, anode material as, e.g., lithium titanate in a polyethylene binder, and cathode material such as and $LiCoO_2$ mixed with a polyethylene binder.

The preform can be heated, e.g., to between about 100° C.-150° C., prior to introduction of the solution into the preform. After the liquid solution is provided in the preform assembly, the preform can be sealed, e.g., with a cyclic olefin copolymer plug, to contain the liquid solution within the preform. The fiber preform is then drawn, e.g., in a draw tower like that of FIG. 6, having a top zone temperature, $T_1$, of about 150° C., a middle drawing zone temperature, $T_2$, of between about 170° C. and about 240° C., and preferably between about 200° C. and about 210° C., a bottom zone temperature, $T_3$, of between about 100° C. and about 110° C., and a cooling zone temperature, $T_4$ of about ambient temperature. A feed speed of between about 0.1 mm/s and about 1.5 mm/s and a capstan speed of between about 0.1 m/min and about 3 m/min can here be employed to draw the fiber.

As explained above, after thermal drawing of a fiber preform into a fiber including a porous domain, the resulting fiber can be subjected to a post-draw process that removes a fluid, such as a liquid, from the porous domain. This methodology can be employed in the fiber battery production process if desired. The fiber preform can be assembled to include a liquid solution including a selected dissolved solid, such as a polymer like those described above, and a selected sacrificial solvent that is not the actual electrolyte and salt solution desired for battery operation. If the electrolyte and/or salt that are desired for a given battery operation are not compatible with the other fiber preform components at the fiber draw temperature, then it can be preferred to produce the porous domain of the fiber with a solvent that is fully compatible with the components at the fiber draw temperature and that can be removed from the porous domain after the fiber is drawn. With this scenario, the porous domain of the fiber battery can be formed by the fiber draw process and then a selected electrolyte and salt solution introduced to the porous domain. This eliminates the constraints placed by the thermal fiber draw conditions on the selection of electrolyte and salt in the solution for forming the battery. Thus, the electrolyte of the battery can be introduced into the fiber at the time of preform assembly or after the porous domain is formed during the fiber draw process.

With a selected electrolytic solution in place in the porous domain of the fiber, the fiber battery is complete, fully functional, and ready to be configured for power delivery in a selected application and with a selected load. For example, at suitable sites on the surface of the fiber the fiber material can be milled to expose the current collectors and connecting, e.g., by soldering, the current collectors to external circuit wiring. Any exposed areas of porous domain or other fiber element can be then protected by, e.g., gently heating the fiber and manipulating fiber material to cover exposed areas, or to apply a selected protective coating over exposed areas. The fiber connection to an external circuit is then complete and operation of the fiber battery for power delivery can commence.

The fiber battery, and/or a plurality of such batteries, can be easily integrated into flexible objects of any shape and size, and can be woven, braided, twisted, or otherwise incorporated into or on an object, including fabrics. The fiber battery can therefore be employed as the building block of a large-area conformal, flexible power source and enables distribution of energy sources across a large-area application. Because the thermal fiber drawing process is inexpensive and intrinsically scalable, in contrast to conventional battery fabrication processes, the fiber battery can be integrated into large systems and in ubiquitous objects with significant cost advantage. The fiber battery thereby enables power source delivery under heretofore unattainable conditions.

With the description provided above, it is demonstrated that the porous fiber provided herein can be employed in a wide range of applications that were heretofore unattainable with a thermally drawn fiber. Applications in the fields of, e.g., energy and power delivery, filtration, insulation, drug delivery, tissue engineering, mass transport, chemical reaction, sensing, and other applications. All of electrical, mechanical, and chemical functionality can be provided in the porous fiber. The porous fiber can be configured, e.g., as a battery, as a drug delivery system, as a chemical reaction chamber, as a sensor, or other functional structure. Along with such functionality, the porous fiber can transmit optical and/or electrical signals through the length of the fiber with regions that are included in the fiber for such transmittal. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:
1. A fiber comprising:
at least one fiber material, including a non-porous outer cladding polymer disposed along a longitudinal-axis fiber length;
a porous domain having a porous domain length along at least a portion of the fiber length and having a porous domain cross section disposed fully interior to the non-porous outer cladding polymer, the porous domain including solid-phase polymer material regions comprising polymer structures packed in a random configuration along the porous domain length and fluid-phase interstitial regions, between the polymer structures, comprising a solvent for the solid-phase polymer, said cladding polymer being chemically resistant to said solvent for the solid-phase polymer; and
wherein said solid-phase material regions and said fluid-phase interstitial regions extend both along the porous domain length and across the porous domain cross section, for three-dimensional porosity of the porous domain.

2. The fiber of claim 1 wherein regions of either one of the solid-phase material and the fluid-phase interstices are interconnected in that phase, separate from the other phase, for isotropic porosity of the porous domain.

3. The fiber of claim 1 wherein regions of either one of the solid-phase material and the fluid-phase interstices are interconnected in that phase, separate from the other phase, for three-dimensional porosity along the longitudinal-axis porous domain length.

4. The fiber of claim 1 wherein regions of either one of the solid-phase material and fluid-phase interstices are interconnected in that phase, separate from the other phase, for three-dimensional porosity across the porous domain cross section.

5. The fiber of claim 1 wherein solid-phase material regions are interconnected in the solid phase, separate from the fluid phase, and form a continuous path through the interconnected solid-phase material regions along the porous domain length.

6. The fiber of claim 1 wherein solid-phase material regions are interconnected in the solid phase, separate from the fluid phase, and form a continuous path through the interconnected solid-phase material regions across the porous domain cross section.

7. The fiber of claim 1 wherein fluid-phase interstitial regions are interconnected in the fluid phase, separate from the solid phase, and form a continuous path through fluid-phase regions along the porous domain length.

8. The fiber of claim 1 wherein fluid-phase interstitial regions are interconnected in the fluid phase, separate from the solid phase, and form a continuous path through fluid-phase regions across the porous domain cross section.

9. The fiber of claim 1 wherein the fluid-phase interstitial regions comprise pores within the solid-phase polymer material regions.

10. The fiber of claim 1 wherein the polymer structures comprise polymer spheres packed in a random configuration along the porous domain length and the fluid-phase interstitial regions comprise interstices between the polymer spheres.

11. The fiber of claim 1 wherein the polymer structures comprise interconnected polymer struts, and wherein the fluid-phase interstitial regions comprise pores between the polymer struts.

12. The fiber of claim 1 wherein the fluid-phase interstitial regions comprise a liquid including the solvent.

13. The fiber of claim 1 wherein the fluid-phase interstitial regions comprise fluid-filled spheres packed in a random configuration along the porous domain length.

14. The fiber of claim 13 wherein the fluid-filled spheres comprise liquid-filled spheres.

15. The fiber of claim 1 wherein the fluid-phase interstitial regions comprise an interconnected population of pores that are filled with a liquid including the solvent.

16. The fiber of claim 1 wherein the fluid-phase interstitial regions comprise an interconnected population of pores that provides a continuous path through the pores along the length of the porous domain.

17. The fiber of claim 1 wherein the fluid-phase interstitial regions comprise an interconnected population of pores that provides a continuous path through the pores across the porous domain cross section.

18. The fiber of claim 1 wherein regions of least one of the solid-phase material and fluid-phase interstices are interconnected in that phase, separate from the other phase, and include a conducting medium, forming a continuous path of conductivity along the porous domain length.

19. The fiber of claim 1 wherein regions of least one of the solid-phase material and fluid-phase interstices are interconnected in that phase, separate from the other phase, and include a conducting medium, forming a continuous path of conductivity across the porous domain cross section.

20. The fiber of claim 1 wherein the solvent comprises an electrolytic liquid.

21. The fiber of claim 20 wherein the electrolytic liquid includes a salt selected from the group consisting of $LiClO_4$, $LiCF_3SO_3$, LiTFSI, and $TEABF_4$.

22. The fiber of claim 1 wherein the porous domain of the fiber is at a temperature below a phase separation temperature characteristic of a liquid solution of said solid-phase polymer and said solvent for said solid-phase polymer.

23. The fiber of claim 22 wherein said phase separation temperature is between about 100° C. and about 300° C.

24. The fiber of claim 20 further comprising:
an electrically conducting anode in contact with the porous domain along the porous domain length interior to said cladding polymer;
an electrically conducting cathode in contact with the porous domain along the porous domain length interior to said cladding polymer; and
a first electrically conducting current collector in contact with the anode along the porous domain length interior to said cladding polymer and a second electrically conducting current collector in contact with the cathode along the porous domain length interior to said cladding polymer.

25. The fiber of claim 1 wherein the cladding polymer has a viscosity that is less than about $10^8$ Poise at a temperature between about 150° C. and about 300° C. and wherein the porous domain of the fiber is at a temperature below a phase separation temperature between about 150° C. and about 300° C. that is characteristic of a liquid solution of said solid-phase polymer and said solvent for said solid phase polymer disposed in the porous domain.

26. The fiber of claim 1 wherein the fiber material comprises one of cyclic olefin polymer and cyclic olefin copolymer.

27. The fiber of claim 1 wherein the porous domain cross section includes the longitudinal axis of the fiber.

28. The fiber of claim 1 wherein the solvent comprises a carbonate ester.

29. The fiber of claim 1 wherein said solvent is selected from gamma-butyrolactone, propylene carbonate, ethylene carbonate, dimethyl carbonate triethylene glycol, and dimethyl sulfoxide.

30. The fiber of claim 1 wherein said polymer is selected from high-density polyethylene, polypropylene, polymethylpentene, polycaprolactone, polylactide, and polyvinylidene fluoride.

31. The fiber of claim 1 wherein the porous domain further includes a salt.

32. The fiber of claim 1 wherein the solid-phase material regions and fluid-phase interstitial regions of the porous domain are ionically-conductive.

33. The fiber of claim 1 wherein the solid-phase material regions and fluid-phase interstitial regions of the porous domain are electrolytic.

* * * * *